US008035648B1

(12) United States Patent
Wloka et al.

(10) Patent No.: US 8,035,648 B1
(45) Date of Patent: Oct. 11, 2011

(54) RUNAHEAD EXECUTION FOR GRAPHICS PROCESSING UNITS

(75) Inventors: Matthias M. Wloka, San Jose, CA (US); Michael Shebanow, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 890 days.

(21) Appl. No.: 11/804,026

(22) Filed: May 15, 2007

Related U.S. Application Data (60) Provisional application No. 60/801,638, filed on May 19, 2006.

(51) Int. Cl.
*G09G 5/39* (2006.01)
*G06T 1/60* (2006.01)
*G06T 1/00* (2006.01)

(52) U.S. Cl. .................. 345/531; 345/530; 345/501

(58) Field of Classification Search .................. 345/501, 345/530, 531, 536
See application file for complete search history.

(56) References Cited

U.S. PATENT DOCUMENTS

| 6,037,946 | A  | * | 3/2000 | Takeda .......................... 345/422 |
| 7,587,584 | B2 | * | 9/2009 | Enright et al. ................. 712/228 |
| 2004/0128448 | A1 | * | 7/2004 | Stark et al. .................... 711/137 |
| 2005/0041031 | A1 | * | 2/2005 | Diard ............................ 345/505 |
| 2006/0149931 | A1 | * | 7/2006 | Haitham et al. .............. 712/218 |

OTHER PUBLICATIONS

Mutlu, et al.; Runahead Execution: An Alternative to Very Large Instruction Windows for Out-Of-Order Processors; Jan. 2003.
James Dundas and Trevor Mudge; Improving Data Cache Performance by Pre-Executing Instructions Under a Cache Miss. Proc. 1997 ACM Int. Conf. on Supercomputing, Jul. 1997, to appear.

* cited by examiner

*Primary Examiner* — Joni Hsu (57) ABSTRACT

A method, in accordance with an embodiment of the invention, includes detecting a memory page miss associated with a thread operating on a Graphics Processing Unit (GPU). A request can be issued to receive the memory page associated with the memory page miss. There can be a switch into a runahead mode. During the runahead mode, a future memory page miss can be detected. During the runahead mode, a request can be issued to receive the future memory page associated with the future memory page miss.

20 Claims, 7 Drawing Sheets

Translation Look-Aside Buffer
500

| Entry 502 → | Virtual Address 506 | Physical Address 508 | Invalid Bit 510 |
|---|---|---|---|
| | • • • | • • • | • • • |
| Entry 504 → | Virtual Address 512 | Physical Address 514 | Invalid Bit 516 |

RUNAHEAD EXECUTION FOR GRAPHICS PROCESSING UNITS

CROSS REFERENCE TO RELATED APPLICATIONS

This patent application claims the benefit of the U.S. Provisional Patent Application No. 60/801,638 entitled "Runahead Execution for Graphics Processing Units", by Matthias M. Wloka et al., filed May 19, 2006, which is assigned to the assignee of the present invention, the disclosure of which is hereby incorporated by reference.

BACKGROUND

It is understood that future operating systems will require Graphic Processing Units (GPUs) to be able to support virtual memory. Therefore, GPUs will no longer be limited to the physical amount of directly connected video-memory or accessible system memory that can be allocated to them. As such, video memory becomes a virtualized resource that the operating system may page in on demand from one or more external storage devices such as disk drives.

When supporting virtual memory, it is understood that the GPU can request data that is not currently within video-memory, thereby causing the GPU to experience a page miss. In response, a request is sent to a Central Processing Unit (CPU) to initiate the fetching of the desired page from disk memory, which has such a significant latency that it can adversely affect the performance of the GPU. Therefore, servicing virtual page misses becomes a potentially severe bottleneck. While traditionally GPUs are able to hide the memory latency of an internal cache miss, e.g., by building long graphics pipes and having many pixels in flight at the same time, it is unrealistic to expect GPUs to build up to the point where it becomes possible to hide the latency of a virtual memory page miss because page-in times from disk are too long for that to be practically feasible.

Regardless, applications involving graphics are going to take advantage of the virtual memory model. As such, the GPU is expected to incur the occasional virtual page miss with potentially disastrous performance breakdowns to the GPU as a consequence.

SUMMARY

Accordingly, embodiments of the invention are directed toward enabling GPUs to operate within a runahead mode. A method, in accordance with an embodiment of the invention, includes detecting a memory page miss associated with a thread operating on a Graphics Processing Unit (GPU). A request can be issued to receive the memory page associated with the memory page miss. There can be a switch into a runahead mode. During the runahead mode, a future memory page miss can be detected. During the runahead mode, a request can be issued to receive the future memory page associated with the future memory page miss.

Another embodiment of the invention includes a computer-readable medium containing a plurality of instructions which when executed cause a GPU to implement a method. The method includes detecting a memory page miss associated with a thread operating on the GPU. The method also includes requesting to receive the memory page associated with the memory page miss. Additionally, the method includes switching the GPU into a runahead mode. Moreover, the method includes detecting during the runahead mode a future memory page miss. The method includes requesting during the runahead mode to receive the future memory page associated with the future memory page miss.

Yet another embodiment of the invention includes a computing system including a disk drive and a Central Processing Unit (CPU) coupled to the disk drive. The computing system also includes a video memory and a GPU coupled to the video memory and the CPU. The GPU can detect a memory page miss associated with a thread operating on the GPU. Also, the GPU can issue a request to the CPU to receive from the disk drive the memory page associated with the memory page miss. Additionally, the GPU can switch into a runahead mode. Furthermore, the GPU can detect during the runahead mode a future memory page miss. Moreover, the GPU can issue a request to the CPU during the runahead mode to receive from the disk drive the future memory page associated with the future memory page miss.

While particular embodiments of the present invention have been specifically described within this summary, it is noted that the invention is not limited to these embodiments. The invention is intended to cover alternatives, modifications and equivalents, which may be included within the scope of the invention as construed according to the Claims.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

In accordance with one embodiment of the invention, when a Graphics Processing Unit (GPU) encounters a virtual memory page miss that involves fetching a page of data from disk memory, the GPU can be switched from its normal execution mode into a runahead mode. While the page of data is being fetched from disk memory, the runahead mode can enable the GPU to detect and prefetch other virtual memory page misses that would have otherwise occurred sequentially, to now be done in parallel. In this manner, the runahead mode can enable the overlapping of virtual memory page misses, which can result in hiding some of the latency of subsequent virtual memory page misses underneath the latency of the first virtual memory page miss.

Figure 1:
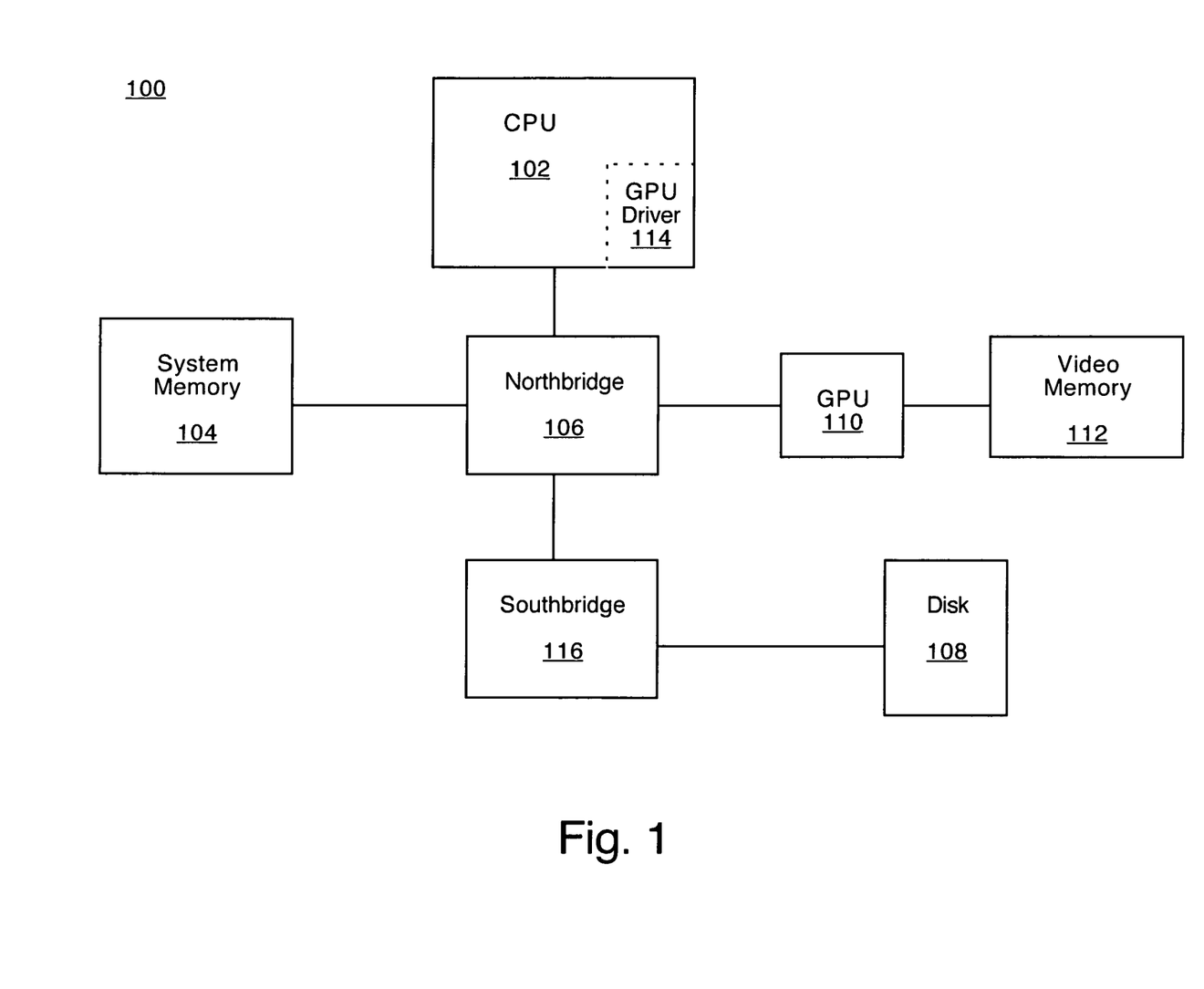
FIG. 1 is a block diagram of an exemplary computing system wherein various embodiments in accordance with the invention can operate.

FIG. 1 is a block diagram of an exemplary computing system 100 wherein various embodiments in accordance with the invention can operate. Computing system 100 depicts the components of a basic computer system in accordance with embodiments of the invention that can provide the execution platform for certain hardware-based and software-based functionality. For example, as part of enabling a Graphics Processing Unit (GPU) 110 of computing system 100 to support virtual memory, runahead execution mode (or computation) in accordance with various embodiments can be implemented with GPU 110 as a method for reducing the occurrence of virtual memory page misses to disk memory 108 and thereby improve the performance of the GPU 110.

Runahead computation for GPU 110 can operate as follows, but is not limited to such. When the GPU 110 encounters a virtual memory page miss that involves fetching a page of data from disk memory 108, GPU 110 does not sit idle and wait for the requested data to arrive within its video (or graphics) memory 112. Instead, GPU 110 can be switched from the original thread it was executing in normal mode into a runahead mode and can continue executing program instructions from the original thread with non-existing data. At the same time the original requested data is being fetched from disk memory 108, GPU 110 can generate additional valid virtual memory page miss requests that would have subsequently occurred within the original normal mode thread. As such, the runahead mode enables GPU 110 to perform intelligent prefetching of pages of data into video memory 112 that would have otherwise resulted in subsequent virtual page misses to disk memory 108 if not prefetched.

Within FIG. 1, it is noted that since GPU 110 continues execution without data from the original virtual memory page miss, the non-existing or invalid data can be tracked to avoid fetching data from erroneous memory locations. Once the original page miss data is fetched from disk memory 108 and stored within video memory 112 via a Northbridge 106 and a Southbridge 116 of computing system 100, GPU 110 can be switched out of the runahead mode and into the normal mode to resume execution of the original thread. Going forward, GPU 110 should experience less virtual memory page misses since the prefetching of those data pages has occurred and/or are in flight to video memory 112.

Within computing system 100, a Central Processing Unit (CPU) 102 can include a GPU software driver 114 operating thereon that enables the proper operation of GPU 110. Furthermore, in various embodiments, GPU driver 114 can be implemented to include functionality that enables GPU 110 to operate in runahead mode or primary execution mode. The primary execution mode can also be referred to as a normal execution mode or a default execution mode or a base execution mode, but is not limited to such. It is noted that the runahead mode functionalities that can be associated with GPU driver 114 are described in detail herein.

Within FIG. 1, computing system 100 can include CPU 102, system memory 104, GPU 110, and Southbridge 116 that are each coupled to Northbridge 106. It is noted that instead of being coupled to Northbridge 106, system memory 104 can alternatively be coupled to CPU 102 (not shown). Additionally, disk memory 108 can be coupled to Southbridge 116 while video memory 112 can be coupled to GPU 110. The couplings between the elements of computing system 100 can be implemented in a wide variety of ways. For example, the couplings between elements of computing system 100 can be implemented by using, but not limited to, one or more hardware communication buses, one or more communication protocols, wired and/or wireless communication, and the like. Note that computing system 100 can include more or less elements than those shown within FIG. 1. Moreover, the elements of computing system 100 can be coupled in different ways than those shown within FIG. 1 in accordance with various embodiments.

It is pointed out that GPU 110 can be implemented as a discrete component, a discrete graphics card designed to couple to computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, CPU 102 can be implemented as, but not limited to, one or more microprocessors, one or more processors, and the like.

Within FIG. 1, system 100 can be implemented as, for example, a desktop computer system, server computer system, laptop computer system, portable computing device, and the like. It is noted that components can be included with system 100 that add peripheral buses, specialized graphics memory, input/output (IO) devices, and the like. Similarly, system 100 can be implemented as a system-on-a-chip, or the like, suited for low power handheld devices (e.g., cell phone, mobile phone, etc.), or can be implemented as a set-top video game console device such as, for example, the Xbox®, available from Microsoft Corporation of Redmond, Wash., or the PlayStation3®, available from Sony Computer Entertainment Corporation of Tokyo, Japan, and the like.

It is noted that GPU 110 can be implemented as a discrete component, a discrete graphics card designed to couple to computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory can be included for the GPU 110 for high bandwidth graphics data storage.

Within FIG. 1, computing system 100 can include one or more CPUs similar to CPU 102, and at least one GPU 110. Note that CPU 102 can alternatively be directly coupled to the system memory 104 via a memory controller (not shown) internal to CPU 102. Furthermore, GPU 110 can be coupled to a display device (not shown). One or more additional GPUs can optionally be coupled to system 100 to further increase its computational power.

Figure 2A:
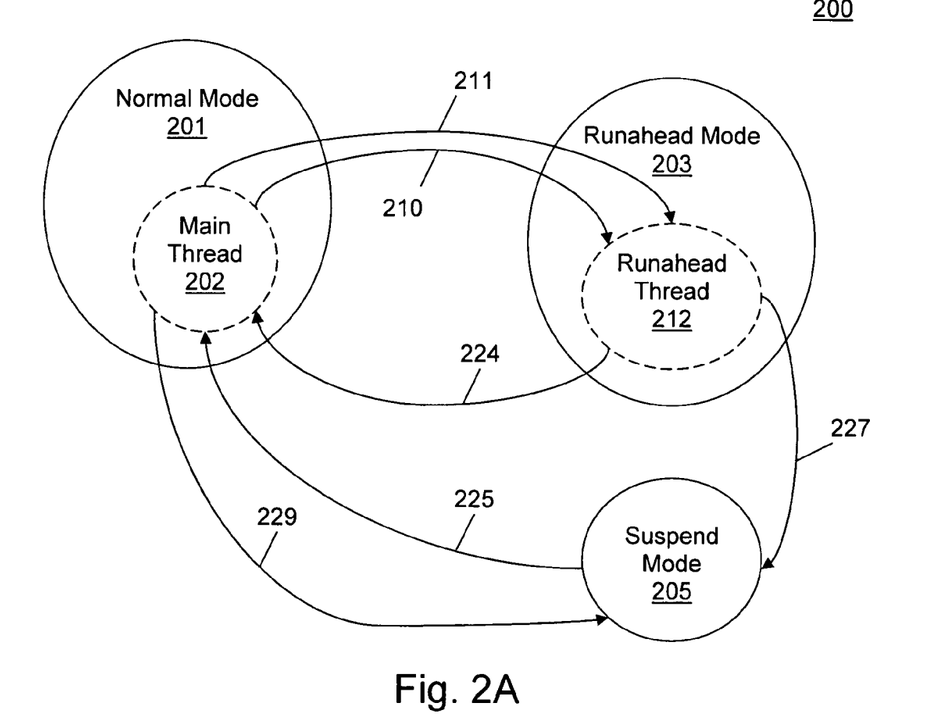
FIG. 2A is a diagram illustrating an exemplary software based GPU runahead approach in accordance with various embodiments of the invention.

FIG. 2A is a diagram illustrating an exemplary software based GPU (e.g., 110) runahead approach 200 in accordance with various embodiments of the invention. Note that FIG. 2A will be described in conjunction with computing system 100 of FIG. 1. It is pointed out that the driver software (e.g., 114) of GPU 110 can implement some of the operations shown and described with reference to FIG. 2A. Within FIG. 2A, a main thread 202 can be operating on GPU 110 in normal execution mode 201. During the operation of main thread 202, the GPU driver 114 can detect a virtual memory page miss, it can cause GPU 110 to issue a virtual page miss request to CPU 102 to receive the memory page of data, and then it can switch the GPU 110 into runahead mode 203 (as indicated by arrow 210). It is noted that the memory page miss can involve any kind of memory slower than the video or graphics memory (e.g., 112). For example in an embodiment, the memory page miss can involve requesting virtual memory from a disk drive (e.g., 108), or requesting a page of main memory to be transferred to graphics memory (e.g., 112). The switching of GPU 110 can include the GPU driver 114 performing a context save, which can involve storing within disk memory 108 the current operating state of GPU 110 with reference to main thread 202. The switching of GPU 110 can also include the GPU driver 114 changing GPU 110's state to disable all external memory writes. Note that disabling external writes can include, but is not limited to, disabling any color writes, disabling any alpha writes, disabling any z-writes, and/or any combination thereof. Next, the GPU driver 114 can switch GPU 110 into runahead mode 203 such that GPU 110 is performing runahead thread 212. Note that runahead thread 212 can allow GPU 110 to runahead with data (valid or invalid) within the execution instructions associated with main thread 202, thereby enabling the possibility of generating additional virtual memory page miss requests along the way. As such, during the operation of runahead thread 212, the GPU 110 in combination with GPU driver 114 try to detect and prefetch as many of the subsequent virtual memory page misses that may occur during the normal mode 201 operations of main thread 202.

For example, during the operation of runahead thread 212, the GPU 110 in combination with GPU driver 114 is able to determine or detect a future virtual memory page miss to disk memory 108 that would have subsequently occurred during the normal mode 201 operations of main thread 202. As such, GPU driver 114 can cause GPU 110 to issue a virtual page miss request to CPU 102 in order to receive the memory page associated with that future virtual page miss. Furthermore, GPU 110 in combination with GPU driver 114 can determine or detect another future virtual page miss that would have subsequently occurred during the normal mode 201 operations of main thread 202. Therefore, GPU driver 114 can cause GPU 110 to issue a virtual page miss request to CPU 102 in order to receive the memory page associated with that future virtual page miss. It is understood that when CPU 102 receives each of the virtual page miss requests, the CPU 102 can initiate the prefetching of each of the corresponding memory pages, which will eventually be received and stored by video memory 112. Note that the corresponding memory pages can each be received and stored by video memory 112 during and/or after runahead mode 203. It is noted that more or less future virtual page misses can be detected or determined within runahead thread 212.

Once the originally requested memory page is returned to video memory 112, the GPU driver 114 can switch GPU 110 out of the runahead mode 203 and into the main thread 202 of the normal execution mode 201, as indicated by arrow 224. It is understood that during normal execution mode 201, GPU driver 114 and GPU 110 may subsequently encounter one or more additional virtual memory page misses to disk memory 108 that would be similar to the original virtual page miss as described above.

Within FIG. 2A, in one embodiment, during the operation of runahead thread 212, the GPU 110 in combination with GPU driver 114 can determine to switch from runahead mode 203 into a suspend or idle mode 205 (as indicated by arrow 227) because there may be little or no advantage for continuing execution of runahead thread 212. For example in one embodiment, a point may be reached where there is not enough useful data to continue executing runahead thread 212 without its future results being substantially useless. Within the suspend mode 205, the GPU driver 114 can basically suspend the operations of GPU 110 and can cause it to wait until the originally requested memory page is returned to video memory 112. At that point, the GPU driver 114 can switch GPU 110 out of the suspend mode 205 and into the main thread 202 of normal execution mode 201, as indicated by arrow 225.

It is noted that in an embodiment, one or more processors and/or software can operate in runahead mode 203 while the GPU 110 enters a suspend mode 205. Specifically, during the operation of main thread 202, the GPU driver 114 can detect a virtual memory page miss, and it can cause GPU 110 to issue a virtual page miss request to CPU 102 to receive the memory page of data. The GPU driver 114 can then switch the GPU 110 from normal mode 201 into a suspend mode 205 (as indicated by arrow 229), and then the GPU driver 114 operating on the CPU 102 can switch into runahead mode 203 (as indicated by arrow 211) in order to emulate the GPU 110 in runahead mode 203 as described herein, but is not limited to such. Note that the switching of GPU 110 into the suspend mode 205 can include the GPU driver 114 performing a context save, which can involve storing within disk memory 108 the current operating state of GPU 110 with reference to main thread 202. Additionally, the switching of GPU 110 into suspend mode 205 can include the GPU driver 114 changing GPU 110's state to disable all external memory writes as described herein, but is not limited to such. Once the originally requested memory page is returned to video memory 112, the GPU driver 114 can switch out of the runahead mode 203 (as indicated by arrow 224). Furthermore, the GPU driver 114 can also switch GPU 110 out of the suspend mode 205 and into the main thread 202 of normal execution mode 201 (as indicated by arrow 225).

Figure 2B:
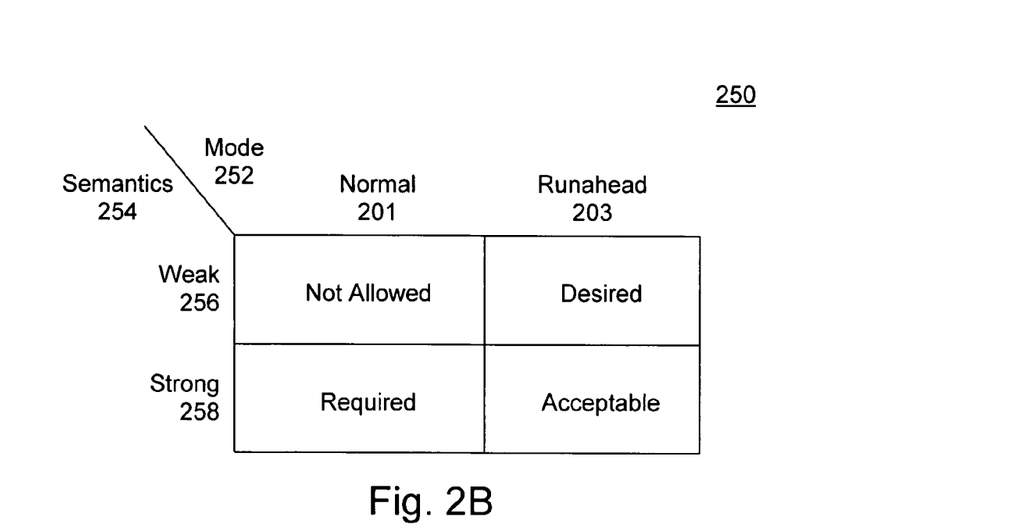
FIG. 2B is an exemplary table pertaining to various embodiments in accordance with the invention.

FIG. 2B is a diagram of an exemplary table 250 pertaining to various embodiments in accordance with the invention. Specifically, table 250 illustrates different types of semantics 254 that can be utilized by a GPU driver (e.g., 114) in combination with a GPU (e.g., 110) when operating in accordance with various embodiments of the invention. For example, the GPU driver 114 can operate the GPU 110 using strong semantics 258 during runahead mode, which means everything is precisely executed by the GPU 110 as originally defined in an API (application program interface). For instance in an embodiment, the GPU driver 114 can operate the GPU 110 using strong semantics 258 during runahead mode by executing the original thread (or command stream) in the same manner as it did during normal mode. Additionally, the GPU driver 114 can operate the GPU 110 using weak semantics 256 during runahead mode, which means GPU 110 just executes what is needed to find more virtual memory page misses. If something does not contribute to that purpose, GPU 110 can safely skip it. For instance, typically all addressing is done with integer calculations while a lot of graphics use floating point calculations. In certain situations it may be basically pointless for the GPU 110 to perform floating point calculations while in runahead mode because typically a floating point number is not used to produce an address. In an embodiment, weak semantics 256 can include any execution mode designed to be a more efficient mode to predict or detect one or more future page misses. In an embodiment, weak semantics 256 can include a more efficient execution mode to approximately predict future page misses (e.g., not all future page misses may be identified or at least one future memory page miss may be misidentified). It is pointed out that a GPU (e.g., 110) operating using weak semantics 256 can thus be more efficient in executing a run-ahead task and thus identify and request more pages from a disk memory (e.g., 108), as compared to a GPU operating using strong semantics 258.

It is pointed out that table 250 includes different modes 252 that the GPU 110 can operate in, which can include normal execution mode 201 and runahead mode 203. Additionally, as mentioned previously, table 250 includes different semantics 254 that the GPU 110 can operate in, which can include weak semantics 256 and strong semantics 258. Specifically for normal execution mode 201, strong semantics 258 is typically required and weak semantics 256 is not allowed. Furthermore, for the runahead mode 203, weak semantics 256 can be desirable and strong semantics 258 is acceptable. It is pointed out that there is no restriction for using strong semantics 258 for runahead mode 203, but it may reduce the amount of virtual memory page misses detected and it may also result in more power consumption by GPU 110. However, in one embodiment, it may be simpler to implement runahead mode 203 using strong semantics 258.

Figure 3:
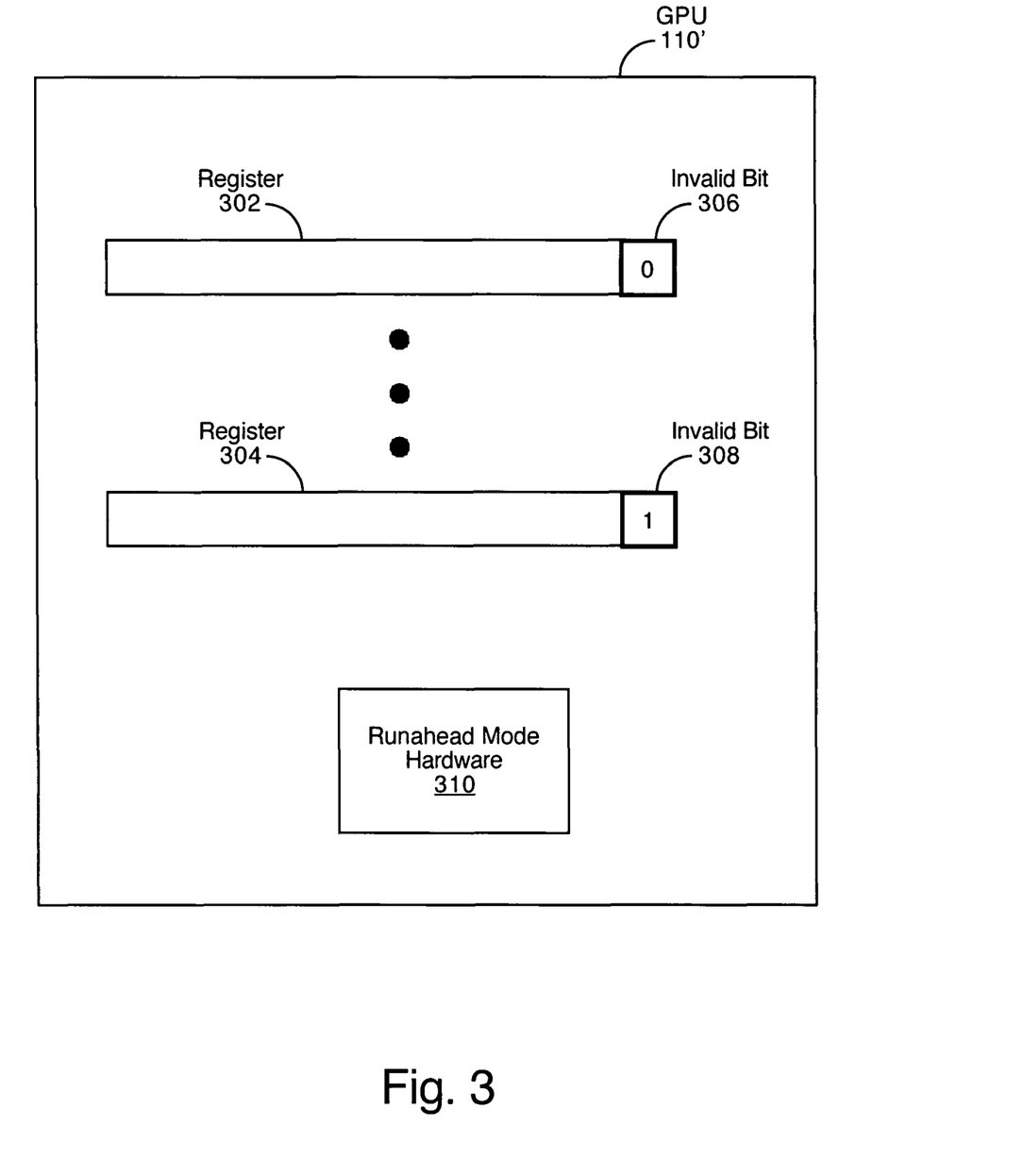
FIG. 3 is a block diagram illustrating an exemplary hardware based GPU runahead approach in accordance with various embodiments of the invention.

FIG. 3 is a block diagram illustrating an exemplary hardware based GPU (e.g., 110') runahead approach in accordance with various embodiments of the invention. Within the exemplary hardware based GPU runahead approach of FIG. 3, the hardware that can be implemented as part of GPU 110' can include, but is not limited to, the addition of one or more transistor gates, which can be included as part of runahead mode hardware 310. Alternatively or in addition, invalid bits can be included with all registers (e.g., 302 and 304) that are utilized within runahead mode and during runahead computations. The GPU runahead hardware can also include the use of strong and weak semantics for operations involving GPU 110'. Note that running a thread (e.g., 202) with strong semantics can be equivalent to the normal, non-runahead operation of the GPU 110'. However, weak semantics can implement the operations of the runahead mode to properly propagate the invalid register bits, and implement optimizations based on this invalid-bit propagation, as well as the fact that invalid data should not get written to memory.

The result of implementing weak semantics within the runahead hardware approach should be a GPU (e.g., 110) that executes faster in runahead mode. Note that weak semantics can allow GPU 110 to runahead further in the same amount of time as compared to executing the same instructions with strong semantics.

Within FIG. 3, it is understood that in order to implement GPU runahead, restoring the state to the point when runahead computations started can be efficiently emulated by fine-grained switching, but is not limited to such. It is pointed out that the hardware based GPU runahead approach enables one or more future virtual page misses to be prefetched (or at least initiated) from disk memory 108 during the runahead mode.

Note that both the GPU software runahead technique of FIG. 2 and the GPU hardware runahead technique of FIG. 3 benefit from the fact that GPU applications are specialized. Typically, the most critical applications operating on GPUs are single thread, full-screen problems, such as but not limited to, personal computer (PC) video games. Thus, when such an application experiences a virtual page miss, there are usually no other graphics threads available to run.

In addition, the programs executing on a GPU (e.g., 110) are largely sequential stream operations since they are mostly branch free, rarely branch based on input data, and are generally data-coherent. Thus, it is noted that runahead computation (or runahead mode) is more efficient the less branches there are, the less data-dependent the program execution is, and the more coherent the data.

Moreover, GPUs (e.g., 110) are generally complex architectures that encode a long pipeline of disparate specialized functions. Each one of these functional units has their own set of caches and thus potential cache misses. GPU runahead mode advantageously provides the ability to prefetch data for all these different caches within the system with little overhead.

Figure 4:
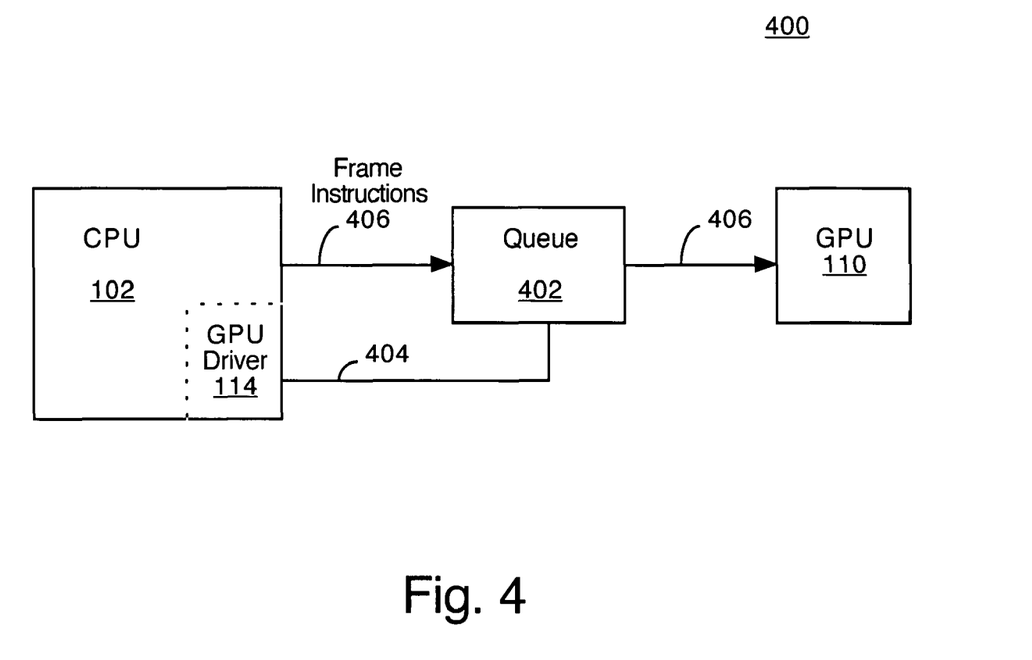
FIG. 4 is a block diagram of an exemplary queue GPU runahead system in accordance with various embodiments of the invention.

FIG. 4 is a block diagram illustrating an exemplary queue GPU runahead system 400 in accordance with various embodiments of the invention. Within FIG. 4, it is understood that GPUs (e.g., 110) can execute instructions out of a queue 402 that can store one or more frames of instructions received from CPU 102. As such, the queue 402 can be viewed as an extremely deep instruction queue.

Within FIG. 4, the queue GPU runahead system 400 includes CPU 102 coupled to the queue 402 thereby enabling the transmission (or transfer) of frame instructions 406 from CPU 102 into queue 402. The queue 402 is coupled to GPU 110 thereby enabling the transmission (or transfer) of frame instructions 406 from queue 402 into GPU 110. It is noted that as part of a runahead mode, the GPU software driver 114' operating on the CPU 102 can be constantly examining the frame instructions 406 stored within queue 402, as indicated by line 404.

Figure 5:
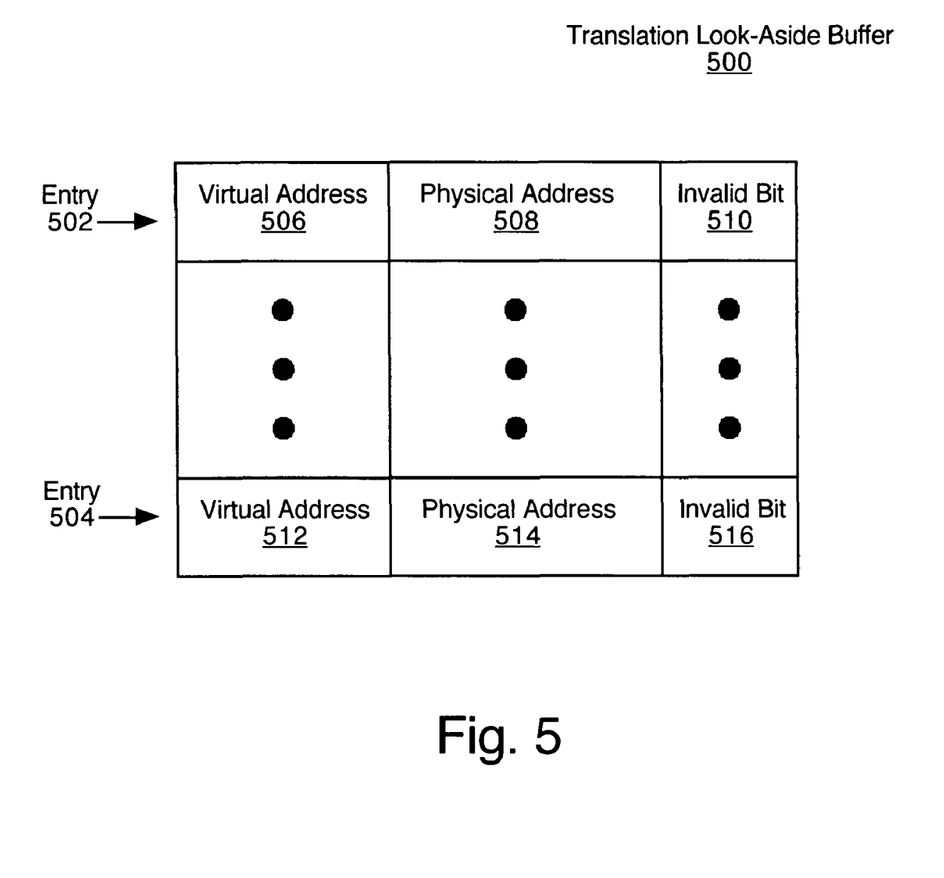
FIG. 5 is a diagram of an exemplary translation look-aside buffer in accordance with various embodiments of the invention.

FIG. 5 is a diagram of an exemplary translation look-aside buffer 500 in accordance with various embodiments of the invention. Specifically, the translation look-aside buffer 500 is a virtual memory map that translates a virtual memory page address with its corresponding physical page address within disk memory 108. The translation look-aside buffer 500 can be stored in video memory 112 and can be utilized by GPU 110. Note that each entry (e.g., 502 or 504) within the translation look-aside buffer 500 has a runahead mode invalid bit (e.g., 510 or 516) associated with it.

Within the translation look-aside buffer 500, a runahead mode invalid bit (e.g., 510) can be utilized during runahead mode to indicate that a particular memory page of data is not really in video memory (e.g., 112). But in order to have the GPU 110 operate during runahead mode when a virtual page miss to disk 108 occurs, the GPU 110 can be instructed that the address translation is valid now. However, any loads or stores from hardware that uses that page of memory can propagate that invalid bit information, if appropriate. Specifically, the invalid bit (e.g., 510 or 516) would get propagated through any runahead computations that could result in a further miss within the translation look-aside buffer 500. In this manner, the GPU 110 or its driver 114 can determine whether or not to produce a memory request cycle during runahead mode based on whether specific data produced an invalid address. So the propagation that you want to protect the GPU 110 from is indicating invalid or bogus memory page prefetches. It is understood that in runahead mode, one of its main purposes is to generate virtual memory page miss addresses that can subsequently be prefetched.

Within FIG. 5, the invalid bit (e.g., 510 or 516) avoids computation that are undesirable during runahead mode (e.g., computation that will not result in addresses), and determines whether a computed address in runahead mode is invalid or valid. However, it is noted that there are choices that can be made once an address is known to be invalid. For example, the first option is not to use it and just skip over it. Alternatively, another option is to potentially fetch the data from the bogus address with the understanding that the bogus address is known to be close enough to where the desired data is located. For example, if the desired data is within a small enough range that is known, such as a byte, it may be desirable to fetch a whole memory page in that vicinity knowing that the desired data is located within that page.

It is understood that the translation look-aside buffer 500 can include any number of entries that are similar to entries 502 and 504. Entry 502 can include a virtual address 506 along with its corresponding physical address 508 and runahead invalid bit 510. Additionally, entry 504 can include a virtual address 512 along with its corresponding physical address 514 and runahead invalid bit 516.

Figure 6:
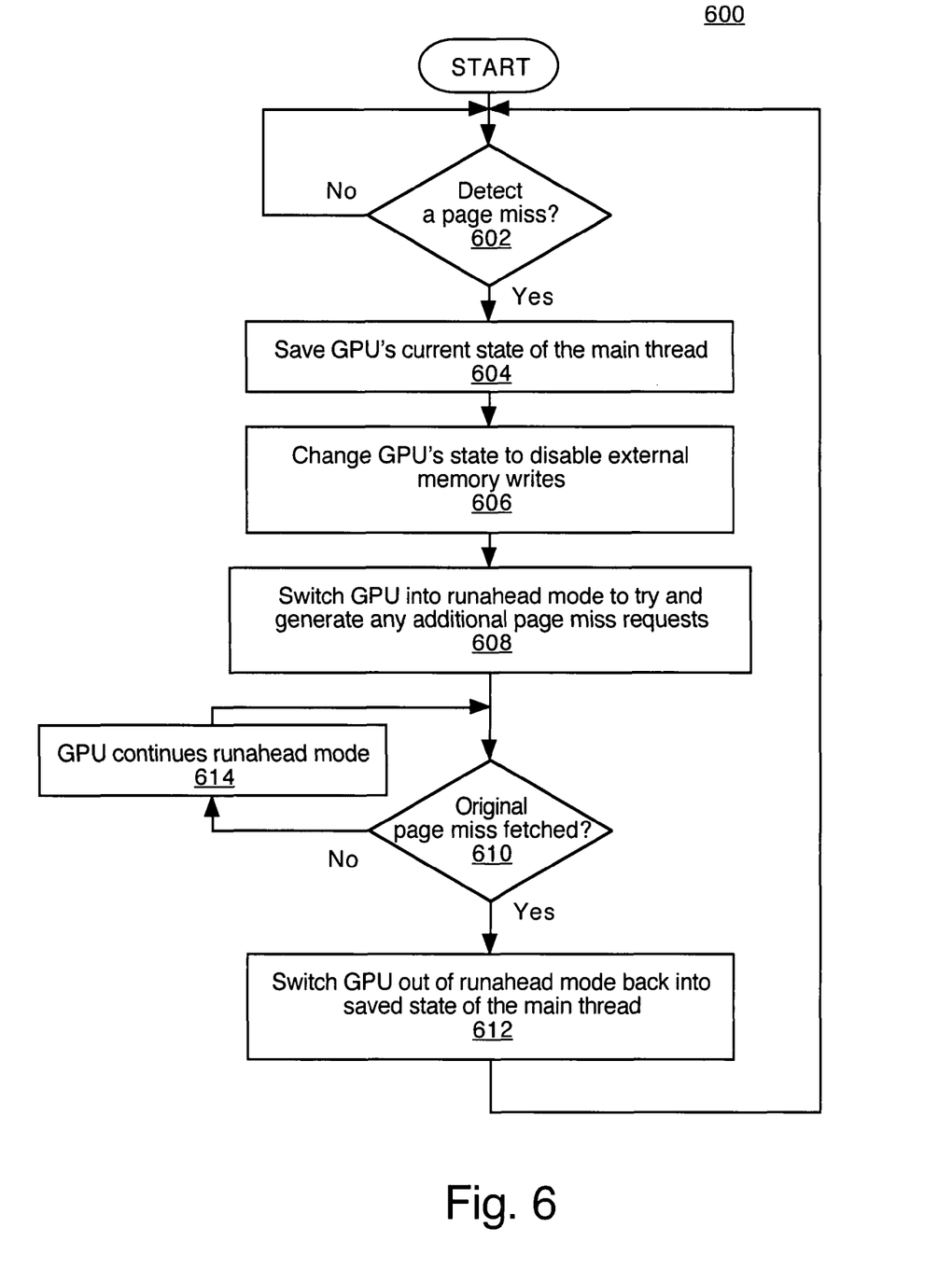
FIG. 6 is a flow diagram of a method in accordance with various embodiments of the invention for executing a runahead mode on a GPU.

FIG. 6 is a flow diagram of a method 600 in accordance with various embodiments of the invention for executing a runahead mode on a GPU. Method 600 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 600, such operations are exemplary. Method 600 may not include all of the operations illustrated by FIG. 6. Also, method 600 may include various other operations and/or variations of the operations shown by FIG. 6. Likewise, the sequence of the operations of method 600 can be modified. It is noted that the operations of method 600 can be performed by software, by firmware, by electronic hardware, or by any combination thereof.

Specifically, a determination can be made as to whether a GPU encounters a virtual memory page miss while operating on a main thread. If not, the determination can be repeated until a virtual memory page miss is encountered by the GPU. If the GPU does encounter a virtual memory page miss, the GPU can perform a switch out of the main thread. It is understood that the switch out of the main thread can include saving to memory the GPU's current state within the main thread. The state of the GPU can be changed in order to disable it from performing any external memory write operations. Additionally, the GPU can be switched into a runahead mode in order to try and generate any additional virtual memory page miss requests. In this manner, any additional virtual memory page miss requests can be initiated and prefetched into video memory of the GPU to be used by the GPU when it returns to performing the main thread. A determination can be made as to whether the original page miss has been fetched. If not, process 600 can continue the runahead mode to generate any additional virtual memory page miss requests. However, if the original page miss has been fetched, the GPU can be switched out of the runahead mode and back into the saved state of the main thread. Note that the saved state can be retrieved from memory in order to return the GPU to that specific state of the main thread.

At operation 602 of FIG. 6, a determination can be made as to whether a GPU (e.g., 110) encounters a virtual memory page miss while operating on a main thread. If it is determined that the GPU is not encountering a virtual memory page miss at operation 602, process 600 can return to the beginning of operation 602 in order to repeat its determination. However, if the GPU does encounter a virtual memory page miss at operation 602, process 600 can proceeds to operation 604. Operation 602 can be implemented in a wide variety of ways. For example in one embodiment, driver software (e.g., 114) for the GPU can be implemented to perform operation 602. It is understood that operation 602 can be implemented in any manner similar to that described herein, but is not limited to such.

At operation 604, the GPU can perform a switch out of the main thread. Understand that operation 604 can be implemented in a wide variety of ways. For example in one embodiment, it is understood that the switch out of the main thread by the GPU can include saving to memory the GPU's current state within the main thread. It is noted that operation 604 can be implemented in any manner similar to that described herein, but is not limited to such.

At operation 606 of FIG. 6, the state of the GPU can be changed or modified in order to disable it from performing any external memory write operations while in a runahead mode. Operation 606 can be implemented in a wide variety of ways. For example in one embodiment, driver software (e.g., 114) of the GPU can perform operation 606. Note that operation 606 can be implemented in any manner similar to that described herein, but is not limited to such.

At operation 608, the GPU can be switched into a runahead execution mode in order to try and generate any additional subsequent virtual memory page miss requests. In this manner, any additional virtual memory page miss requests can be initiated and prefetched into video memory of the GPU to be eventually used by the GPU when it returns to performing the main thread. It is noted that operation 608 can be implemented in a wide variety of ways. For example in one embodiment, driver software of the GPU can enable the GPU to operate in runahead mode and to generate any additional virtual memory page miss requests at operation 608. Operation 608 can be implemented in any manner similar to that described herein, but is not limited to such.

At operation 610 of FIG. 6, a determination can be made as to whether the original page miss has been fetched or retrieved. If it is determined at operation 610 that the original page miss has not been fetched, process 600 can proceed to operation 614. However, if it is determined at operation 610 that the original page miss has been fetched, process 600 can proceed to operation 612. Understand that operation 610 can be implemented in a wide variety of ways. For example, operation 610 can be implemented in any manner similar to that described herein, but is not limited to such.

At operation 614, the GPU can continue the runahead mode to generate any additional virtual memory page miss requests. Operation 614 can be implemented in a wide variety of ways. For example in one embodiment, driver software (e.g., 114) of the GPU can enable the GPU to continue within the runahead mode to generate any additional virtual memory page miss requests at operation 614. Understand that operation 614 can be implemented in any manner similar to that described herein, but is not limited to such.

At operation 612 of FIG. 6, the GPU can be switched out of the runahead mode and back into the saved state of the main thread where the original virtual memory page miss occurred or was encountered. It is noted that operation 612 can be implemented in a wide variety of ways. For example in one embodiment, the saved state can be retrieved from memory at operation 612 in order to return the GPU to that specific state within the main thread where the original virtual memory page miss occurred or was encountered. It is understood that operation 612 can be implemented in any manner similar to that described herein, but is not limited to such. Once operation 612 is completed, process 600 can proceed to operation 602.

Figure 7:
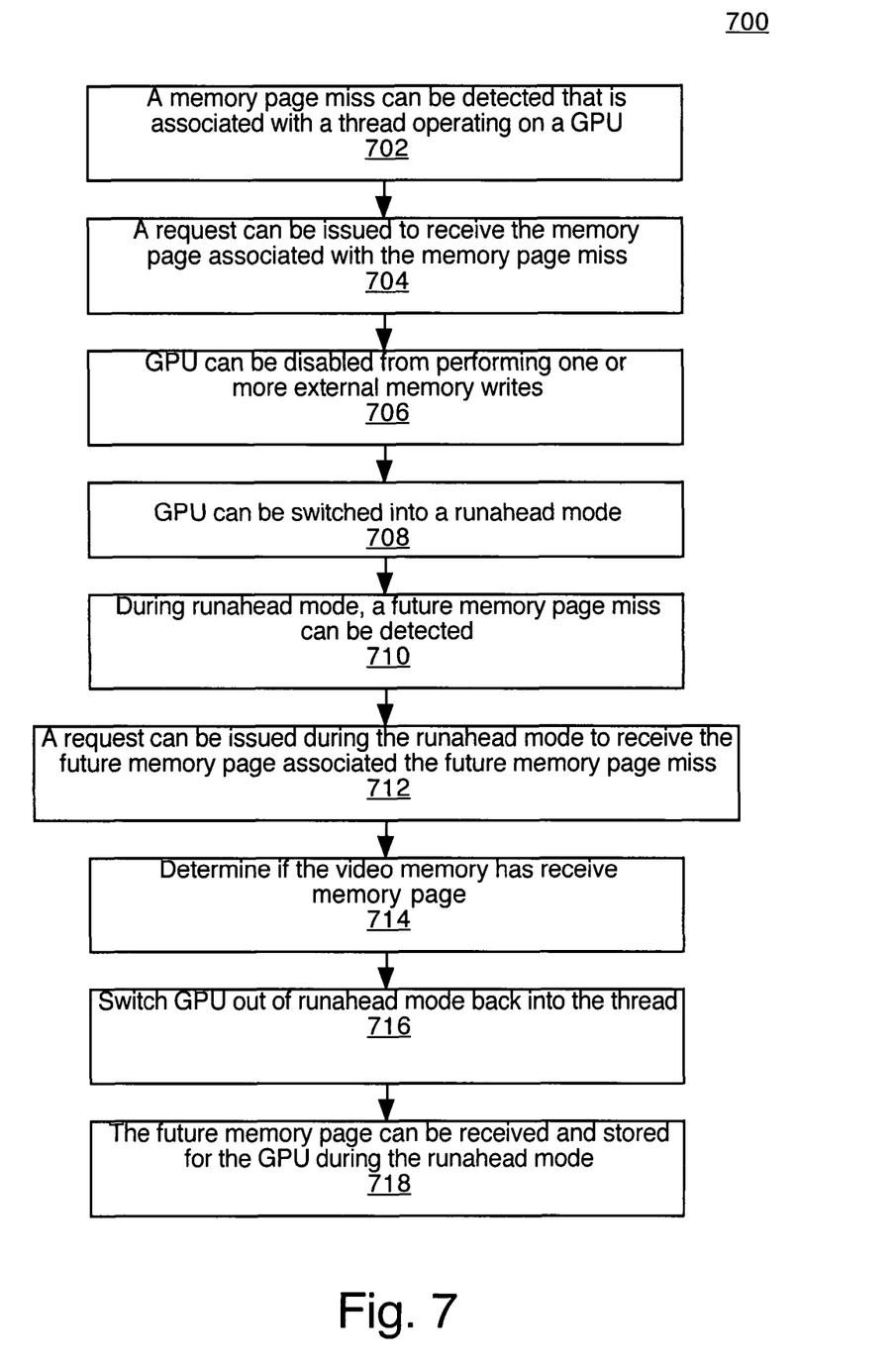
FIG. 7 is another flow diagram of a method in accordance with various embodiments of the invention for executing a runahead mode on a GPU.

FIG. 7 is a flow diagram of a method 700 in accordance with various embodiments of the invention for executing a runahead mode on a GPU. Method 700 includes exemplary processes of various embodiments of the invention which can be carried out by a processor(s) and electrical components under the control of computing device readable and executable instructions (or code), e.g., software. The computing device readable and executable instructions (or code) may reside, for example, in data storage features such as volatile memory, non-volatile memory and/or mass data storage that are usable by a computing device. However, the computing device readable and executable instructions (or code) may reside in any type of computing device readable medium. Although specific operations are disclosed in method 700, such operations are exemplary. Method 700 may not include all of the operations illustrated by FIG. 7. Also, method 700 may include various other operations and/or variations of the operations shown by FIG. 7. Likewise, the sequence of the operations of method 700 can be modified. It is noted that the operations of method 700 can be performed by software, by firmware, by electronic hardware, or by any combination thereof.

Specifically, a memory page miss can be detected that is associated with a thread operating on a Graphics Processing Unit (GPU) in normal execution mode. A request can be issued to receive the memory page associated with the memory page miss. The GPU can be disabled from performing one or more external memory writes. The GPU can be switched from normal execution mode into a runahead mode. It is noted that the switching can include saving the current state of the GPU, after the detecting of the memory page miss. During the runahead mode, one or more future memory page misses can be detected. A request can be issued during the runahead mode to receive the future memory page associated the future memory page miss. A determination can be made as to whether the memory page has been received by video memory. The GPU can be switched out of the runahead mode and into the thread of its normal execution mode, in response to the memory page being received. The future memory page can be received and stored for the GPU during the runahead mode.

At operation 702 of FIG. 7, a memory page miss can be detected that is associated with a thread operating on a GPU (e.g., 110) in normal execution mode. Operation 702 can be implemented in a wide variety of ways. For example in one embodiment, driver software (e.g., 114) for the GPU can be implemented to perform operation 702. It is understood that operation 702 can be implemented in any manner similar to that described herein, but is not limited to such.

At operation 704, a request can be issued to receive the memory page associated with the memory page miss. Understand that operation 704 can be implemented in a wide variety of ways. For example, operation 704 can be implemented in any manner similar to that described herein, but is not limited to such.

At operation 706 of FIG. 7, the GPU can be disabled from performing one or more external memory writes. Operation 706 can be implemented in a wide variety of ways. For example, operation 706 can be implemented in any manner similar to that described herein, but is not limited to such.

At operation 708, the GPU can be switched from normal execution mode into a runahead mode. Operation 708 can be implemented in a wide variety of ways. For example in one embodiment, the switching can include saving the current state of the GPU, after the detecting of the memory page miss. It is noted that operation 708 can be implemented in any manner similar to that described herein, but is not limited to such.

At operation 710 of FIG. 7, during the runahead mode, one or more future memory page misses can be detected. It is understood that operation 710 can be implemented in a wide variety of ways. For example, operation 710 can be implemented in any manner similar to that described herein, but is not limited to such.

At operation 712, a request can be issued during the runahead mode to receive the future memory page associated with each future memory page miss. It is noted that operation 712 can be implemented in a wide variety of ways. For example, operation 712 can be implemented in any manner similar to that described herein, but is not limited to such.

At operation 714 of FIG. 7, a determination can be made as to whether the memory page has been received by video memory. Operation 714 can be implemented in a wide variety of ways. For example, operation 714 can be implemented in any manner similar to that described herein, but is not limited to such.

At operation 716, the GPU can be switched out of the runahead mode and into the thread of its normal execution mode, in response to the memory page being received. It is understood that operation 716 can be implemented in a wide variety of ways. For example, operation 716 can be implemented in any manner similar to that described herein, but is not limited to such.

At operation 718 of FIG. 7, the one or more future memory pages can be received and stored for the GPU during the runahead mode. It is noted that operation 718 can be implemented in a wide variety of ways. For example, operation 718 can be implemented in any manner similar to that described herein, but is not limited to such.

With regard to embodiments of the invention, it is noted that whenever a GPU (e.g., 110 or 110') is ideal for whatever reason, the GPU can be switched into a runahead thread (or mode) in order to prefetch memory pages of data (or any other amount of data from memory) in any manner similar to that described herein, but is not limited to such. With regard to embodiments of the invention, it is pointed out that a GPU can be switched into a runahead mode during any type of virtual memory miss. As such, the GPU can detect and prefetch any future virtual memory miss of any size.

The foregoing descriptions of various specific embodiments in accordance with the invention have been presented for purposes of illustration and description. They are not intended to be exhaustive or to limit the invention to the precise forms disclosed, and it is evident that many modifications and variations are possible in light of the above teaching. The invention can be construed according to the Claims and their equivalents.

What is claimed is:

1. A method comprising:
   detecting a memory page miss associated with a thread operating on a Graphics Processing Unit (GPU);
   requesting to receive said memory page associated with said memory page miss;
   switching said GPU into a suspend mode;
   switching a GPU driver into a runahead mode, wherein said GPU driver operates on a processor coupled to said GPU, wherein said GPU driver skips performing a floating point calculation during said runahead mode;
   said GPU driver detecting during said runahead mode a future memory page miss; and
   said GPU driver requesting during said runahead mode to receive said future memory page associated with said future memory page miss.

2. The method of claim 1, wherein said switching said GPU into said suspend mode comprises:
   saving current state of said GPU.

3. The method of claim 1, wherein said switching said GPU into said suspend mode comprises:
  disabling said GPU from performing an external memory write.

4. The method of claim 3, wherein said external memory write is a color write, an alpha write, or a z-write.

5. The method of claim 1, further comprising:
  determining whether said memory page has been received.

6. The method of claim 5, further comprising:
  after said memory page is received, switching said GPU driver out of said runahead mode; and
  after said memory page is received, switching said GPU out of said suspend mode.

7. The method of claim 1, wherein said switching said GPU into said suspend mode is performed by said GPU driver.

8. A non-transitory computer-readable medium containing a plurality of instructions which when executed cause a computing system to implement a method comprising:
  detecting a memory page miss associated with a thread operating on a Graphics Processing Unit (GPU);
  requesting to receive said memory page associated with said memory page miss;
  switching said GPU into a suspend mode;
  switching a GPU driver into a runahead mode, wherein said GPU driver operates on a processor coupled to said GPU, wherein said GPU driver skips performing a floating point calculation during said runahead mode;
  said GPU driver detecting during said runahead mode a future memory page miss; and
  said GPU driver requesting during said runahead mode to receive said future memory page associated with said future memory page miss.

9. The non-transitory computer-readable medium of claim 8, wherein said switching said GPU into said suspend mode comprises:
  saving current state of said GPU.

10. The non-transitory computer-readable medium of claim 9, further comprising:
  utilizing said saved current state to switch said GPU out of said suspend mode and into said thread.

11. The non-transitory computer-readable medium of claim 8, wherein said switching said GPU into said suspend mode comprises:
  disabling said GPU from performing an external memory write.

12. The non-transitory computer-readable medium of claim 8, wherein said memory page miss involves a memory slower than a graphics memory coupled to said GPU.

13. The non-transitory computer-readable medium of claim 8, further comprising:
  detecting receipt of said memory page.

14. The non-transitory computer-readable medium of claim 13, further comprising:
  after said detecting, switching said GPU driver out of said runahead mode.

15. A computing system comprising:
  a disk drive;
  a processor coupled to said disk drive;
  a video memory;
  a Graphics Processing Unit (GPU) coupled to said video memory and said processor; wherein said computing system for implementing a method comprising:
    detecting a memory page miss associated with a thread operating on said GPU;
    requesting to receive said memory page associated with said memory page miss;
    switching said GPU into a suspend mode;
    switching a GPU driver into a runahead mode, wherein said GPU driver operates on said processor coupled to said GPU, wherein said GPU driver skips performing a floating point calculation during said runahead mode;
    said GPU driver detecting during said runahead mode a future memory page miss; and
    said GPU driver requesting during said runahead mode to receive said future memory page associated with said future memory page miss.

16. The system of claim 15, wherein said switching said GPU into said suspend mode comprises saving current state of said GPU, after said detecting said memory page miss.

17. The system of claim 15, wherein said wherein said switching said GPU into said suspend mode comprises disabling said GPU from performing an external memory write.

18. The system of claim 17, further comprising:
  after said memory page is received, switching said GPU driver out of said runahead mode.

19. The system of claim 15, wherein said switching said GPU into said suspend mode is performed by said GPU driver.

20. The system of claim 15, wherein said video memory is for receiving and storing said future memory page for said GPU.

* * * * *